United States Patent
Vuskovic et al.

(10) Patent No.: US 12,525,230 B2
(45) Date of Patent: Jan. 13, 2026

(54) CONVERSATIONAL ARTIFICIAL INTELLIGENCE RUNTIME SYSTEM USING A HUMAN-LIKE INSTRUCTIONS

(71) Applicant: Google LLC, Mountain View, CA (US)

(72) Inventors: Vladimir Vuskovic, Zollikerberg (CH); Lukasz Bieniasz-Krzywiec, Mercer Island, WA (US); Jingwei Zhang, Menlo Park, CA (US); Ferdinand Lösch, Grambow (DE)

(73) Assignee: Google LLC, Mountain View, CA (US)

( * ) Notice: Subject to any disclaimer, the term of this patent is extended or adjusted under 35 U.S.C. 154(b) by 211 days.

(21) Appl. No.: 18/236,661

(22) Filed: Aug. 22, 2023

(65) Prior Publication Data
US 2025/0069595 A1    Feb. 27, 2025

(51) Int. Cl.
G10L 15/18    (2013.01)
G10L 15/183   (2013.01)
G10L 15/22    (2006.01)

(52) U.S. Cl.
CPC ......... G10L 15/183 (2013.01); G10L 15/22 (2013.01); *G10L 2015/223* (2013.01)

(58) Field of Classification Search
CPC . G10L 15/183; G10L 15/22; G10L 2015/223; G06Q 10/10; G06Q 30/015; G06F 40/35
See application file for complete search history.

(56) References Cited

U.S. PATENT DOCUMENTS

2024/0386216 A1* 11/2024 Sodhi .................. G06F 40/40
2024/0412720 A1* 12/2024 Vasylyev ........ G06F 16/90332

OTHER PUBLICATIONS

Swamy, et al., "Contextual Prompting for Response Generation in Task-oriented Dialog Systems," published Jan. 30, 2023, 10 pages.
DataRoot Labs, blog, "NVIDIA Nemo Guardrails: Reinforcing Trust and Safety in AI Chatbot Interactions", May 5, 2023, 12 pages.
Chockalingam, et al., "NVIDIA Enables Trustworthy, Safe, and Secure Large Language Model Conversational Systems," Apr. 25, 2023, 5 pages.
Jeffrey Burt, "Keeping Large Language Models From Running Off The Rails," Apr. 26, 2023, 8 pages.
Zhou et al., Least-to-Most Prompting Enables Complex Reasoning in Large Language Models, May 21, 2022, 61 pages.
"MLflow LLM Tracking" downloaded from https://mlflow.org/docs/latest/llm-track ing.html; Published May 12, 2023, 2 pages.

* cited by examiner

*Primary Examiner* — Qian Yang
(74) *Attorney, Agent, or Firm* — Lerner David LLP (57) ABSTRACT

Systems and methods are provided that allow for efficient and reliable execution of complex tasks using large language models (LLMs). Disclosed systems may include a runtime manager that is in communication with an LLM, and which controls the LLM's execution of the complex task. This control can be defined by a "playbook" that is provided to the LLM, and which contains a series of instructions that are to be followed by the LLM under a desired level of control by the runtime manager. The playbook can take the form of a script containing a sequence of instructions and related conditions that are written in a human-readable, natural-language format.

18 Claims, 5 Drawing Sheets

```
1. // Collect $AccountToPay                                                          300

301    ↪ 1. Tool(GetBalancesPerAccount) // Get customer bill information from account(s)
   311a
         ↪ 2. // Optionally choose between multiple accounts
   311b
              ↪     - If customer has more than one account, show the balance for each account and ask which
           311c    account the customer wants to pay ↪  - If customer only has one account, use the $AccountId as $AccountToPay.
           311d 2. // Collect payment for $AccountToPay 302    ↪ 1. Tool(GetBalanceDetail, $AccountToPay) // Get detailed balance information for the account
       312a
          312b → - If tool fails: RespondTemplate("Alternatively, you can pay by..."), Done()

312c → 2. // Collect $PaymentAmount from customer

312d →  - If `$AmountDue != 0 OR $AmountPastDue != 0`: GenerateResponse(Explain the
                   $AmountPastDue and $AmountDue` on customer's account)

312e →  - If `$SuspendNonPay = true`: RespondTemplate("Please pay at least $AmountPastDue to
303                 reactivate your account")

↳3. // Collect payment information.

4. // strict_mode: true Confirm payment

304    ↪ 1. RespondTemplate("You want to pay $AmountDue using card $CardNumber, is that correct?")
       314a
  314b → 2. Extract($PaymentConfirmed)

5. // strict_mode: true Submit payment

305    ↪ - If `$PaymentConfirmed = true`: Tool(SubmitPayment)
       315a
  315b → -Else: AbortStrictMode() // LLM is taught to either recover and re-enter, or send cancellation event 6. // Inform the payment has been processed 306    ↪   If `$SuspendNonPay = true AND $PaymentAmount >= $AmountPastDue`
       316a
          316b → - If `$ProductType = "wireless"` RespondTemplate("To restore your wireless service, ...")
          316c →   If `$ProductType = "others"` RespondTemplate("Your service will be restored shortly")
   316d →    Else: GenerateResponse(Tell customer the $PaymentAmount has been processed)
316e ↘
     If customer asks about bill details: Playbook(BillExplanation)
316f →
     If customer wants to pay multiple accounts, repeat step 2 and reuse the payment information.
```

CONVERSATIONAL ARTIFICIAL INTELLIGENCE RUNTIME SYSTEM USING A HUMAN-LIKE INSTRUCTIONS

BACKGROUND

Standard conversational artificial intelligence (AI) has drawbacks with regard to stability and predictability, which hinders the implementation of conversational AI in many applications. Even with the introduction of large language models (LLMs), current developments have failed to leverage the capabilities of LLMs in providing reliable assistance in completing complex tasks.

BRIEF SUMMARY

What is needed are systems and methods that allow an LLM to efficiently and reliably complete complex tasks in a controlled manner. In accordance with aspects of the disclosure, a system may include a runtime manager that is in communication with an LLM, and which controls the LLM's execution of a complex task. This control is defined by a "playbook" that is provided to the LLM, and which contains a series of instructions that are to be followed by the LLM under a desired level of control by the runtime manager. The playbook can take the form of a script containing a sequence of instructions and related conditions that are written in a human-readable, natural-language format. The playbook may also intermix the human-readable instructions with various structured logical conditions that are specific to particular computer applications.

In accordance with aspects of the disclosure, a method for controlling conversational artificial intelligence may include: receiving, by a runtime manager, a playbook, wherein the playbook contains a plurality of instructions to be performed in connection with performing a task, and wherein at least a subset of the instructions are in a natural language format; instructing, by the runtime manager, a large language model to execute the playbook; identifying, by the runtime manager, an execution state in connection with the large language model executing one or more instructions within the playbook; and providing, by the runtime manager, an output based on the identified execution state.

In accordance with still other aspects of the disclosure, the method may further include identifying a control level for the runtime manager, wherein the control level defines the extent to which the runtime manager is to identify particular execution states in connection with the execution of the playbook by the LLM. Identifying the control level may further include selecting between at least a first level of higher control and a second level of lower control, and the runtime manager may identify more execution states under the first level of higher control than under the second level of lower control. If the control level is identified as a low level of control, instructing the large language model to execute the playbook comprises the large language model performing group of multiple instructions from the plurality of instructions without providing the runtime manager with an execution state in connection with the group of multiple instructions. In addition, identifying the control level may be based on a user selecting the control level from a plurality of potential control levels.

In accordance with still other aspects of the disclosure, the playbook may be a first playbook from a plurality of playbooks, and identifying the control level may include selecting the first playbook from the plurality of playbooks based on the control level that has been identified. In addition, the playbook may be a first playbook from a plurality of playbooks, and the plurality of instructions of the first playbook may include an instruction to execute a second playbook.

In accordance with yet other aspects of the disclosure, instructing the large language model to execute the playbook may include creating, by the runtime manager, a dynamically composed prompt based on a user context. In addition, executing the playbook may include executing a stack of calls to task operators, as well as identifying, by the runtime manager, a current position within the stack.

In accordance with other aspects of the disclosure, executing the playbook may include calling a remote application that provides one or more returned values, and wherein the one or more returned values are provided to the large language model by dynamically updating the playbook during execution of the playbook by the LLM.

In accordance with still other aspects of the disclosure, a system for controlling conversational artificial intelligence may include: a runtime manager configured to communicate with the large language model and configured to receive a playbook, wherein the playbook contains a plurality steps in connection with performing a task, and wherein at least a subset of the steps are in a natural language format; a large language model (LLM) configured to execute the playbook in accordance with communications from the runtime manager; wherein the runtime manager is configured to identify an execution state in connection with the large language model executing one or more instructions within the playbook, and is configured to provide an output based on the identified execution state.

In yet other aspects of the disclosure, the runtime manager may be further configured to identify a control level execution of the playbook, and wherein the control level defines the extent to which the runtime manager is to identify particular execution states in connection with the execution of the playbook by the LLM. In addition, identifying the control level may further include selecting between at least a first level of higher control and a second level of lower control, and wherein the runtime manager is configured to identify more execution states under the first level of higher control than under the second level of lower control. If the control level as identified as a low level of control, the large language model may be configured to execute the playbook by performing a group of multiple instructions from the plurality of instructions without providing the runtime manager with an execution state in connection with the group of multiple instructions. Identifying the control level may be based on a user selecting the control level from a plurality of potential control levels.

In still other aspects of the disclosure, the runtime manager may be further configured to instruct the large language model to execute the playbook by providing a dynamically composed prompt based on a user context. In addition, the runtime manager may be configured to manage execution states for a stack of playbooks.

In still other aspects of the disclosure, the system may include a remote application, and executing the playbook may include calling the remote application. In addition, one or more returned values from the remote application may be provided to the large language model in the context of dynamically updating the playbook during execution of the playbook by the LLM.

BRIEF DESCRIPTION OF THE DRAWINGS

FIG. 3 is a playbook that can be used in accordance with aspects of the disclosure.

DETAILED DESCRIPTION

The technology generally relates to generation and use of a runtime system for a large language model (LLM). In accordance with aspects of the disclosure, the runtime system is able to implement a "playbook" that is configured to instruct an LLM how to perform a particular task. The playbook can take the form of a script containing a sequence of instructions and conditions that are written in human-readable natural-language format. The playbook may also intermix the natural language instructions with various structured logical conditions that are specific to particular computer applications. The system may include a runtime manager that communicates with a LLM and instructs the LLM in a manner that is in accordance with the playbook that has been provided.

Figure 1:
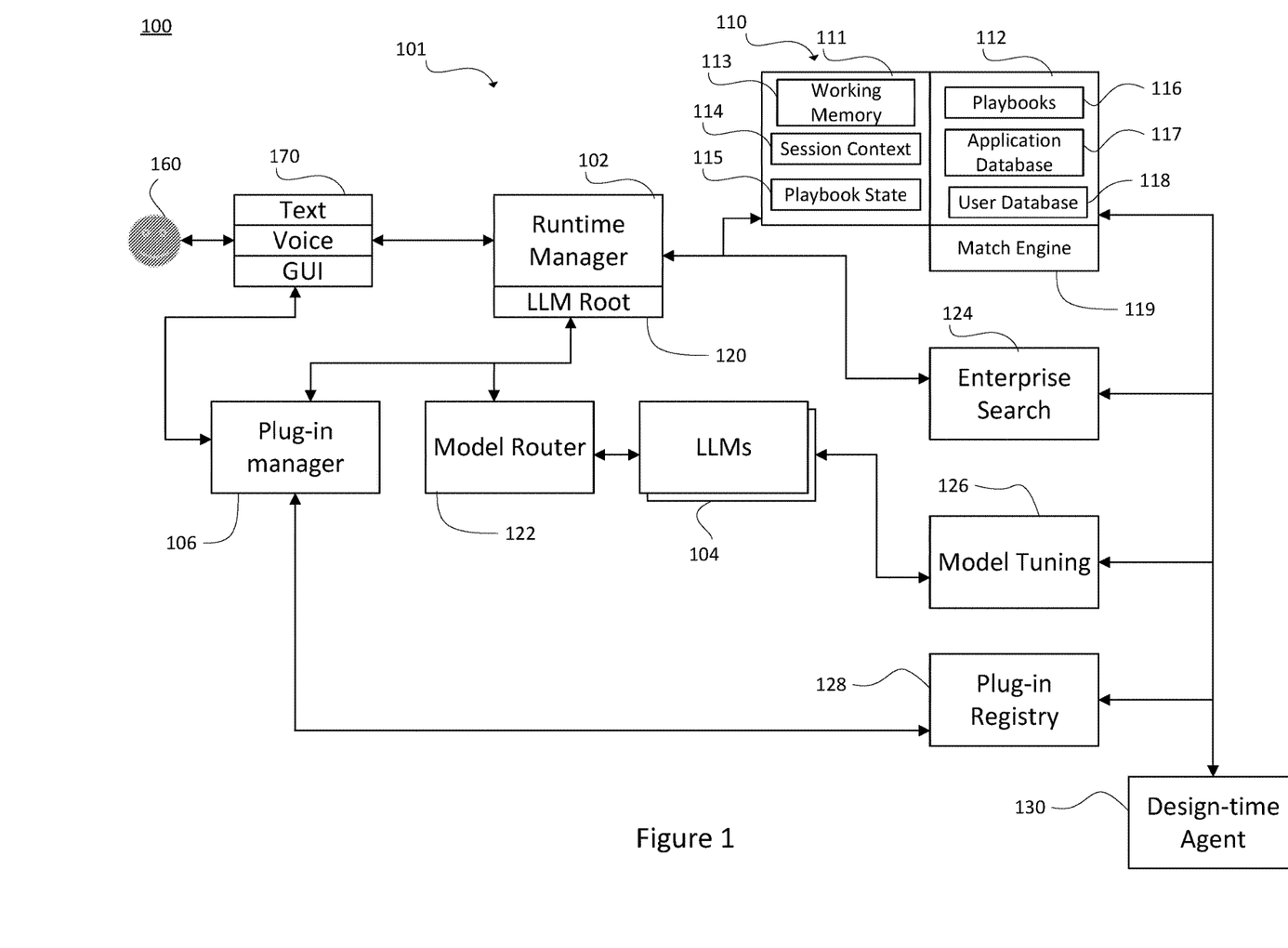
FIG. 1 is a block diagram of a system in accordance with aspects of the disclosure.

FIG. 1 is a block diagram 100 of a system 101 that can perform operations in accordance with aspects of the disclosure. System 101 can include a runtime manager 102, one or more large language models 104, as well as a plug-in manager 106. Runtime manager 102 can access memory 110, which may include a short-term memory 111 and a long-term memory 112. The long-term memory 112 can include databases of information relating to particular applications or particular users, including, for example, a database of playbooks 116, applications 117, and a database of user-related data 118, each of which can be accessed by runtime manager 102. The long-term memory 112 may also include particular data that has been collected during prior sessions using runtime manager 102. The short-term memory 111 can include a working memory 113 for a particular task or set of tasks. This may include data relating to the current context of a session 114 with a particular user, as well as data relating to execution states 115 within particular playbooks. For example, as described herein, a playbook may contain a plurality of instructions or sub-tasks that are executed by LLMs 104, and an execution state within the playbook can be determined by runtime manager 102 upon one or more of the instructions or sub-tasks being completed by the LLM. The memory 110 may also be accessible via a match engine 119.

The runtime manager 102 can be configured to receive communications from an application 170 that receives input from a user 160. Application 170 may be, for example, a website or other application that receives text, voice, graphical-user inputs, or other types of inputs from user 160. Based on communications from application 170, runtime manager 102 can identify a playbook that corresponds to the received communication. For example, if a user 160 may seek to set up an account with a particular business, and may ask for help in connection with setting up an account by submitting a request for help via an application 170, such as a website or a mobile app interface. This request can be transmitted to runtime manager 102.

Upon application 170 submitting the user's request, runtime manager 102 can be configured to identify one or more playbooks that can be executed in connection with responding to the received request. An identified playbook can then be provided by runtime manager 102 to an LLM 104. The communication between runtime manager 102 and LLM 104 may take place via an LLM Root 120 and a model router 122. For example, runtime manager 102 may communicate a playbook that can be executed by one of a plurality of LLMs 104, and model router 122 may be used to direct the communication of the playbook to a particular LLM 104. In addition, runtime manager 102 is configured to determine the execution state of the LLM as it executes the playbook that is provided, and runtime manager 102 can be responsible for controlling particular actions that are to be made in connection with executing the playbook. For example, in determining the execution state of the LLM, runtime manager 102 may identify that the LLM as performed a particular instruction or set of instructions within the playbook, and runtime manager may update the playbook state memory 115 with the current execution state of the LLM with respect to that playbook. In addition, as discussed herein, one or more LLMs may be running multiple playbooks in connection with performing an overall task. In accordance with aspects of the disclosure, runtime manager 102 may determine the current execution state for each of the playbooks that are being executed, and this information may be updated and stored within short-term memory 111.

A playbook may invoke remote functions, which entail making calls to remote plug-ins, or other remote applications, in order to perform specific actions or retrieve specific data. These calls to remote plugins can be made by runtime manager 102 via plug-in manager 106, which has access to a plug-in registry 128. Data generated by the remote plug-in can be transmitted to runtime manager 102 and provided to the LLM 104 that is executing the playbook that instructed the call to be made. For example, runtime manager 102 may dynamically update the playbook that the LLM 104 is executing so as to include data that has been received from the remote plug-in. In addition, runtime manager 102 may dynamically update the playbook that the LLM 104 is executing based on other data, include data that has been received from user 160 via application 170, as well as data that is stored in memory 110. For example, a playbook may identify various parameters within a playbook that are to be assigned values.

In addition, runtime manager 102 may handle asynchronous execution of long-running plug-ins and other remote tasks. For example, runtime manager 102 may instruct an LLM 104 to perform particular instructions within a playbook while the runtime manager is awaiting a response to a call made to a remote plug-in. In addition, runtime manager 102 may dynamically update the playbook based on a response received from the remote plug-in, thereby allowing the LLM 104 to proceed with particular instructions that rely on data contained in the received response.

Runtime manager 102 may access memory 110 or receive user input from application 170 in order to assign or update the parameters within the playbook with the appropriate values. Runtime manager 102 may dynamically update the playbook while an LLM 104 is executing the playbook, and the update may be performed in connection with runtime manager 102 identifying a particular execution state with respect to the playbook that is being executed. For example, upon determining that a particular set of instructions has been executed within a playbook, runtime manager 102 may request information from user 160 via application 170. Upon receiving the requested information, via application 170, runtime manager 102 may update the playbook, as well as the execution state of the playbook.

Components of system 101 may also be reconfigured via a design-time agent 130. For example, an enterprise search 124, model tuning 126, plug-in registry 128, as well as memory 110 can be updated or otherwise altered based on commands provided by design-time agent 130. Enterprise search 124 may include servers that are used for performing particular searches in connection with the operations that are to be performed by runtime manager 102 and LLM 104. Model tuning 126 may conclude devices that are in communication with LLMs 104, and which provide LLMs 104 with training data or otherwise tune the LLMs in accordance with a particular set of data.

As discussed above, system 101 is configured so that runtime manager 102 can control one or more LLMs 104 as they execute one or more playbooks. A playbook can define an overall task that an LLM 104 is to perform in executing the playbook. This task can be presented as a goal that is to be achieved through the execution of the playbook. The playbook can contain instructions that have varying degrees of structure. Highly-structured instructions can be included in the playbook whereby a runtime manager 102 can exert a high level of control over the operations performed by the LLM 104. Less-structured or semi-structured instructions can also be included in the playbook, whereby the runtime manager 102 exerts a lower level of control over the operations performed by the LLM 104. For example, semi-structured instructions may allow the LLM 104 to perform multiple actions without seeking approval from the runtime manager 102. As described herein, structured instructions may take the form of programmatic conditions or programmatic operations, while less-structured instructions may take the form of natural-language instructions, which can be parsed by the LLM 104 without explicit control from a runtime manager 102. Accordingly, a playbook may be designed to give the runtime manager 102 various levels of control over the execution of the playbook by LLM 104.

A playbook may be designed to have an explicit return status that defines a type of success or a type of failure in connection with execution of the playbook. The playbook can also be designed to define the scope of actions and tools that the runtime manager 102 and LLM 104 can access during execution of the playbook. The playbook can be executed to perform a complete task, or multiple playbooks can be executed in order to perform a plurality of sub-tasks that are each a part of the overall task that is to be performed. While an LLM 104 is capable of performing relatively complex actions based on natural-language inputs, the LLM 104 may have difficulties performing a complex task that require a large number of actions to be performed in order to complete the task. In accordance with aspects of the disclosure, the runtime manager can access and implement playbooks in a manner that allows the LLM 104 to efficiently and effectively perform complex tasks. In addition, the disclosed implementation of playbooks makes the resources of an LLM 104 available in a manner that better defines the scope, context, and task management of the operations being performed by the LLM.

Figure 2:
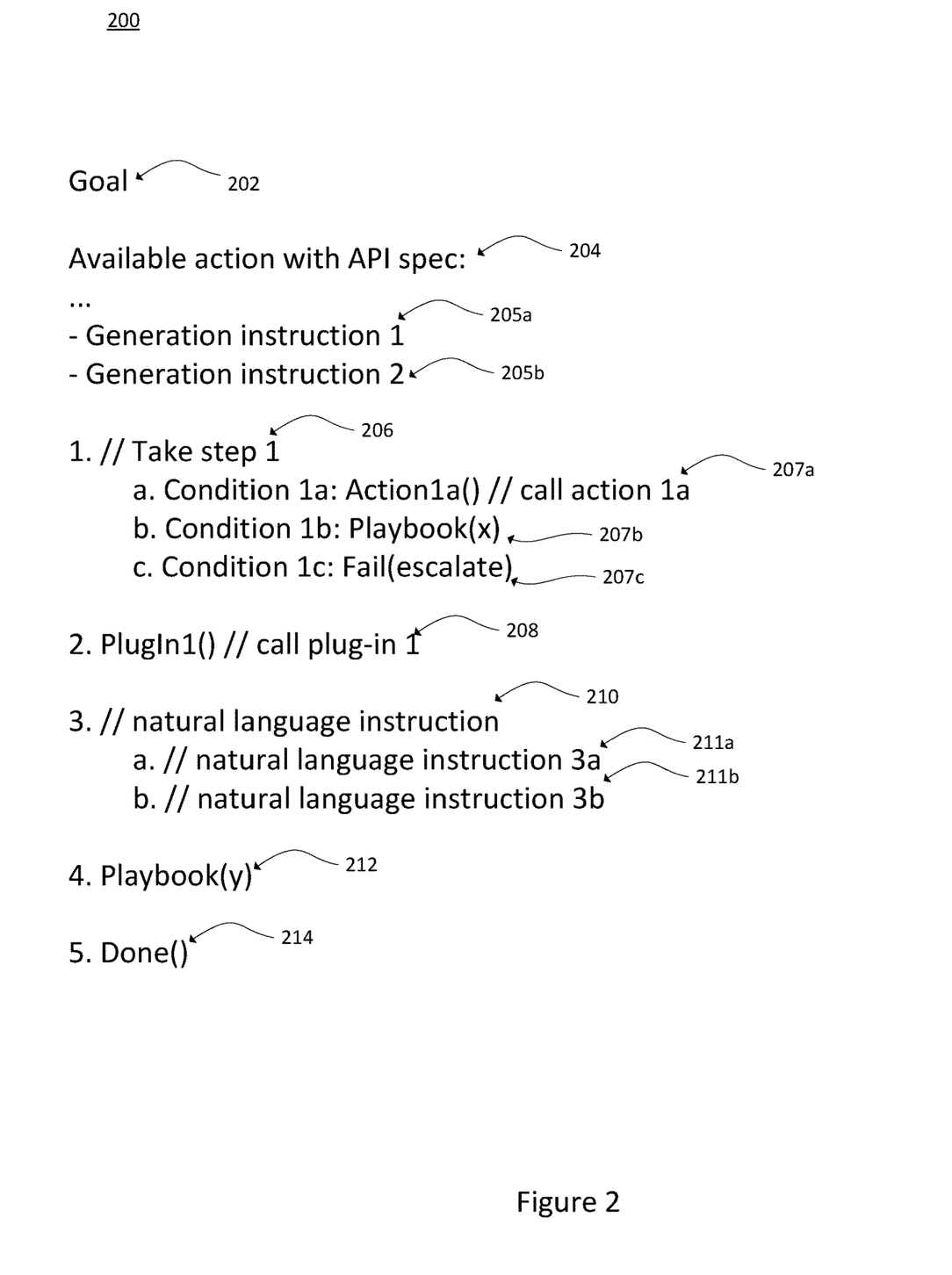
FIG. 2 is representation of the type of instructions that can be found within a playbook in accordance with aspects of the disclosure.

FIG. 2 is a representation of a type of instruction set that can be found within a playbook 200. These instructions may take the form of prompts that provide contextual information, commands to perform actions, or logic regarding conditional requirements for one or more instructions. These instructions may include human-readable natural language instructions, as well as specific calls to other applications, such as calls to one or more plug-ins. Playbook 200 of FIG. 2 provides a description of the types of instructions that For example, the first instruction 202 of playbook 200 can take the form of a prompt that describes the goal of the overall task that is to be performed. This instruction 202 prompt may contain information about the context of the playbook's execution, including what is hoped to be achieved by the execution of the playbook, as well as information about the reason that the playbook is being executed. The goal identified in instruction 202 may be general or detailed, depending on the context that the playbook is to be used. For example, instruction 202 may state that "Your goal is to collect payments from customers." Instruction 202 may also provide additional context of the goal, if the playbook has been designed for that particular context. For example, instruction 202 may state that "Your goal is to collect payments from customers who are more than a month late in making their payments." Instruction 202 can be designed to provide enough information to a particular LLM that the LLM will be configured in response to instruction 202 to perform the remaining instructions of playbook 200 in the desired fashion.

Instruction 204 is a prompt that identifies the available actions within the given specifications of the application programming interface ("API"). Instruction 204 may include a plurality of generation instructions 205*a-b* that list available tools and available actions to be taken during execution of playbook 200. The instructions 205*a-b* may also include dynamically updated generation instructions. For example, the runtime manager may dynamically update variables or other parameters with specific data that has been obtained from the user or elsewhere. These dynamically updated parameters may be provided as generation instructions 205*a-b* that define the values of particular parameters.

Instruction 206 represents an instruction to perform a particular "step 1" as part of the task that is to be completed. As shown in playbook 200, the instruction 206 may include a plurality of conditional actions 207*a-c*. Conditional actions 207*a-c* may take the form of an if-then conditional phrase, or may be presented as part of a natural-language statement indicating that certain prerequisites must exist for a particular action to be taken in connection with "step 1." The conditional actions for instruction 206 may include a call for the LLM to perform a particular action, such as represented by conditional action 207*a*. The conditional actions may also take the form of implementing another playbook, as is represented by conditional action 207*b*. For example, if "Condition 1b" is satisfied, the LLM may implement "Playbook(x)" as conditional action 207*b*. This conditional action 207*b* may include instructing the LLM to make a request to the runtime manager for Playbook(x) to be provided to the LLM, as well as an instruction to execute Playbook(x). The conditional actions may also identify a failure condition, and provide the LLM with instructions to respond to the failure condition. For example, conditional action 207*c* can specify a condition that will prevent further actions from being taken, and conditional action 207*c* can instruct the LLM to present the runtime manager with an output that indicates the failure. The indication of failure may include providing a request for additional information from the user. For example, if it is determined that a particular user account does not exist, conditional action 207*c* could cause the LLM to indicate this failure with the runtime manager, and provide a prompt that seeks confirmation from the user that the correct account number has been provided.

Instruction 208 represents an instruction to call a plugin that can be used to provide additional information or perform particular actions. The runtime manager may make the call to the plugin based on a communication received from the LLM. The call to the plugin may include a particular conversational context to set parameters of the plugin call. Data received from the plugin may be provided to the LLM, including by dynamically updating one or more parameters identified within playbook 200.

Instruction 210 represents a natural-language instructions that the LLM will be able to implement based on the LLM's capabilities of language-based artificial intelligence. As described herein, the natural-language instructions can contain commands that are formatted as a human-readable sentences. Instruction 210 may include sub-instructions 211a-b, which are also presented as natural-language instructions. These sub-instructions 211a-b can take the form of conditional instructions or can be a set of sub-tasks that are to be performed in connection with instruction 210. In accordance with aspects of the disclosure, the natural language instruction 210 and sub-instructions 211a-b may be presented to the LLM as part of a low control mode of operation. Within a low control mode of operation, the LLM may execute multiple instructions within a set of instructions, including performing multiple actions associated with the set of instructions, without notifying the runtime manager that specific instructions within the set of instructions have been executed. In this low control mode, the LLM will proceed through at least a portion of the playbook 200 without the runtime manager identifying or updating the execution state of the system within playbook 200. For example, instruction 210 and sub-instructions 211a-b may be executed by the LLM without notifying the LLM that these particular steps have been executed. In this low control mode, the LLM is trusted to execute the instructions in an acceptable manner, and the LLM may be given flexibility to perform the instructions in a manner that the LLM decides is appropriate based on the context of the instructions within playbook 200.

Instruction 212 represents an instruction to implement a particular playbook, which is designated as "Playbook(y)." Instruction 212 may include instructing the LLM to make a request to the runtime manager for Playbook(y) to be provided to the LLM, as well as an instruction to execute Playbook(y). In connection with executing instruction 212, the runtime manager may update the execution state for playbook 200 to designate that it is currently implementing Playbook(y) in connection with instruction 212. Once implementation of Playbook(y) is complete, the runtime model can update the execution state for playbook 200 to indicate that instruction 212 has been completed, and that the LLM has returned from implementing Playbook(y) of instruction 212 to implementing the next instruction of playbook 200.

Instruction 214 represents an instruction to indicate that execution of playbook 200 has been completed. Upon execution of instruction 214, the runtime manager may update the execution state for playbook 200 to indicate that the system has completed its execution of playbook 200. In accordance with instruction 214, LLM may notify the runtime manager that it has completed playbook 200, as well as providing runtime manager with one or more outputs that have been defined within instruction 214 as an output parameter for playbook 200.

The systems and methods for implementing playbooks in accordance with aspects of the disclosure may be used in connection with specific business, platforms, and applications. For example, playbooks can be generated in connection with contact center automation, helpdesk and support for employees or third-parties, conversational device control, personal assistants, and providing suggestions and help in connection with a website or an application that is running on a user device. As discussed herein, a runtime manager can be configured to access playbooks from a database of playbooks, in order to perform specific tasks by receiving user inputs, identifying particular playbooks in connection with the user inputs, having an LLM execute the identified playbooks, and providing the user with an output that is based on the LLM's execution of the identified playbooks.

FIG. 3 is a playbook 300 containing a set of instructions that can be implemented in connection with collecting a bill payment from a customer. For example, a user may be accessing a payment application on a mobile device, and the payment application may be configured to communicate with a runtime manager. Based on communications from the mobile device, the runtime manager may determine that the collection of a bill payment is needed, and may access playbook 300 from a database of playbooks. The runtime manager may then provide playbook 300 to one or more LLMs, which execute the instructions within playbook 300.

In addition to the instructions shown in FIG. 3, playbook 300 may include additional instructions in the form of a prompt that specifies the goal to be achieved by the execution of playbook 300, as well as defining the actions that can be performed by the LLM. For example, in connection with providing playbook 300 to an LLM, the runtime manager may provide the LLM with a prompt that states "Your goal is to collect payment from customers." In addition, the runtime manager may provide the LLM with a prompt that defines API specifications. This prompt may state, "You have access to the following tools:", and the prompt can be followed with a list of business logic tools and parameters relating to the tools. The runtime manager may also provide the LLM with a prompt that states "You can take the following actions:", and follow this prompt with a description of actions that can be taken by the LLM during execution of the playbook 300. A prompt to follow the instructions of playbook 300 may also be provided to the LLM. For example, a prompt that "You must follow the playbook:" may be provided to the LLM, followed by the instructions of playbook 300.

Playbook 300 of FIG. 3 contains a set of instructions 301-306 that are to be executed in order to perform the task of collecting a payment from a customer. Instructions 301-306 can be numbered as particular steps within playbook 300, and some instructions may include sub-instructions, such as sub-instructions 311a-316f, which are associated with a particular step within playbook 300. Sub-instructions 311a-316f are themselves instructions, and may be referred herein as instructions 311a-316f. Instruction 302 provides instructions for collecting account information for a customer, and includes instructions 311a and 311b. The account information is designated as "$AccountToPay", which can be a parameter that has been defined in connection with the playbook prompts discussed above. In instruction 311a, a call is made to a remote tool that is designated "GetBalancePerAccount". This remote tool can be called in accordance with a previously provided prompt that identified the tool and parameters for calling the tool. Instruction 311b provides an instruction to "optionally choose between multiple accounts", and two conditional instructions 311c and 311d are provided in connection with instruction 311b. Conditional instructions 311c and 311d provide instructions for the manner of proceeding when the customer is identified to have one account or is identified to have more than one account. For instruction 311c, the LLM is instructed that if the "customer has more than one account," it is to "show the balance for each account and ask which account the customer wants to pay". In executing this instruction, the LLM may provide an output to the runtime manager that includes a particular message to be transmitted to the customer, and this particular message will include an inquiry for the customer to identify which account is to be paid. In accordance with instruction 311*d*, if the customer has only one account, then the LLM will designate the account ID, which is defined as "$AccountId", as the designated "$AccountToPay", which defines the account that is to be paid.

Instruction 302 is an instruction to collect payment from the identified account, and it includes a call to a remote tool designated "GetBalanceDetail" (Instruction 312*a*). Within instruction 312*a*, a natural-language description is provided, which states, "Get detailed balance information for the account", and a parameter "$AccountToPay" is included as a part of the call to the remote tool, GetBalanceDetail. Instruction 312*b* includes a natural-language conditional instruction for invoking a template for providing a response to the customer.

Instruction 312*c* is a natural language description for collecting a particular payment amount from the customer. This instruction 312*c* includes a conditional sub-instruction 312*d*, in which the LLM is instructed to generate a response explaining the amount that is due on the account as well as the amount that is past due. In addition, sub-instruction 312*e* is a conditional instruction in which the customer is provided with an output identifying the amount of payment that is needed, if it is determined that the customer's account is currently suspended. Sub-instructions 312*d* and 312*e* each use programmatic conditions to identify if particular parameters are equal or not equal to a particular value. These determinations may be made by the LLM communicating with the runtime manager, which can provide the LLM with confirmation of whether particular programmatic conditions are met by the identified parameters.

Instruction 303 is a national-language instruction to collect payment information. In addition, playbook 300 contains some instructions that are designated as "strict mode" instructions, such as instructions 304 and 305, as well as their sub-instructions 314*a-b* and 315*a-b*. These strict mode instructions are instructions in which the runtime manager will identify the execution state for each step, and will control the execution of each step that is a part of the strict mode of operation. For example, instruction 304 is a strict mode instruction to confirm payment, in which the runtime manager, in accordance with instructions 314*a-b*, will provide a response template to the customer, seeking confirmation that the customer wants to pay the specified amount using a means of payment (e.g., an identified credit card number) that has been determined by the LLM and runtime manager.

If the customer has responded to the confirmation request provided in accordance with the sub-instructions for instruction 304, the runtime manager can update the execution state and proceed to instruction 305, in which a strict mode level of control will be implemented by the runtime manager to determine if a payment is to be submitted. For example, in accordance with conditional instruction 315*a*, if the value "$PaymentConfirmed" is determined to be true, a tool for submitting payment will be executed. Otherwise, conditional instruction 315*b* is executed, which instructs the LLM to perform an "AbortStrictMode( )" operation, in which the LLM can be instructed to either recover and re-enter the playbook at a particular state of execution, or the LLM can generate a cancellation notification.

Instruction 306 and the related sub-instructions 316*a-f* provide runtime manager and LLM with instructions for informing the customer that the payment has been processed. The sub-instructions 316*a-d* are presented as conditional instructions that contain branching steps, which can be parsed by the LLM. The actions associated with these instructions can include strict responses or less strict responses that are to be provided to the customer by the LLM and runtime manager. For example, in connection with instructions 316*b* and 316*c*, the instructions provide for determining whether the parameter "$ProductType" is assigned the value of "wireless" or "others", and based on this determination, a "RespondTemplate" operation will be performed in which a specific message is communicated to the customer. Each specific message is provided within instructions 316*b* and 316*c* within quotation marks, which designates the message as being one that the LLM needs to reproduce as an exact response.

A less strict response can also be generated by the LLM, such as for instruction 316*d*, in which a "GenerateResponse" instruction is provided. In connection with instruction 316*d*, the LLM will generate a response to provide to the user based on the prompt contained within the instruction, as well as based on the context of the instruction. Thus, instruction 316*d* does not control the exact content of the response that is to be generated by the LLM, making it a less-strict response than those provided in connection with instructions 316*b* and 316*c*. The above-discussed instruction 312*d* also provides an example of a less-strict response in which the LLM is instructed to generate a response to explain the amounts that are due and past due on the customer's account.

Instruction 316*e* is a conditional instruction in which it is determined whether the customer has asked about bill details, and if so a playbook designated "BillExplanation" is executed. Executing the BillExplanation playbook within playbook 300 can be processed as a playbook stack, in which the BillExplanation playbook will be fully executed prior to returning to playbook 300. In addition, the BillExplanation playbook may itself instruct the system to execute yet another playbook as part of the execution of the BillExplanation playbook. In accordance with aspects of the disclosure, the runtime manager can identify the execution state within each playbook, and have the LLM return to the correct location within each playbook once the higher playbooks in the stack have been fully executed.

In addition, playbook 300 can contain instructions in which the LLM is instructed to reuse information that has previously been obtained in connection with executing the playbook. For example, instruction 316*f* is a conditional instruction in which payment information is reused in connection with repeating certain steps of the playbook in order to pay multiple accounts.

A playbook may also format instructions as either natural-language instructions or programmatic instructions, and may use the format of the instructions to control whether the instruction is to be evaluated, or otherwise executed, by the runtime manager or the LLM. For example, instructions 312*d*, 312*e*, 315*a*, and 316*a-c* of playbook 300 each contain programmatic conditions. These programmatic conditions can be evaluated by the runtime manager, as they entail programmatically determining if particular parameters have been given particular values. Instructions 311*c*, 311*d*, 312*b*, 316*e*, and 316*f* each contain natural-language conditions. These natural-language conditions can be evaluated by the LLM, and the LLM can directly perform the specified action of the instruction without requiring that the runtime manager provide additional input or control.

In addition, a playbook may include unordered instructions that can be applied in an unordered fashion relative to one another. For example, the natural-language conditions for instructions 311*c* and 311*d* are presented in an unordered fashion, and may be executed as part of instruction 311*b* in any order that the LLM determines. Instructions 316*e* and 316*f* are also presented as unordered instructions, and can be executed while the system is in any execution state within playbook 300. For example, the customer may provide an input requesting details about the customer's bill information. Upon receiving this input via the runtime manager, the LLM may determine that the condition for instruction 316*e* is satisfied and in accordance with instruction 316*e*, the LLM may call for the runtime manager to execute the "BillExplanation" playbook.

As can be seen in the example of playbook 300, particular sets of instructions can be designed as part of a tree structure that can reflect a hierarchical task decomposition. The runtime manager can identify and manage this hierarchical structure, however it is not required to do so in all instances. For example, particular playbooks may be configured so that the runtime manager has a low level of control over the LLM during its execution of either all or parts of the playbook. When operating under a low level of control, the LLM will be responsible for parsing the hierarchical structure and appropriate order for the instructions to be performed. In addition, under a low level of control, the LLM may perform a set of multiple instructions without providing the runtime manager with any communications that would identify the LLM's execution state with respect to the playbook. For example, a playbook may be configured so that all of the instructions of the playbook are performed by the LLM, and the runtime manager only determines the execution state of the LLM upon all of the playbook instructions being completed or upon the LLM communicating that it has failed to execute the playbook.

Under a low level of control, the LLM can be responsible for parsing the instructions of the playbook, tracking the execution state in view of the parsed instructions, and taking particular actions in view of the current execution state, including generating necessary responses given a particular action. This process can be repeated for each instruction or set of instructions until the entire task has been completed.

A playbook may also be configured to provide the runtime manager with higher levels of control during execution of the playbook by the LLM. For example, particular tasks could be associated with a plurality of different playbooks, with each playbook giving the runtime manager a different level of control over the LLM's execution of the playbook. In another example, a particular playbook could be modified, so as to alter the level of control that the runtime manager is given during the LLM's execution of the playbook. As part of a higher level of control, the runtime manager may determine the current execution state in the context of the LLM's execution of the playbook. This determination may include identifying the instructions that have been executed by the LLM, as well as identifying the next instruction, or step, that is to be performed by the LLM. Under a high level of control, the playbook can be designed to require the LLM to request input from the runtime manager prior to performing a particular instruction or set of instructions within the playbook.

In accordance with aspects of the disclosure, a playbook can be implemented in accordance with one of a plurality of different control levels. For example, the runtime manager and LLM may operate in one of three or more different modes, with each mode giving the runtime manager a different level of control over the LLM's execution of the playbook instructions. The first mode could be referred to as a soft guardrail mode, in which the LLM is given the responsibility of performing a large portion of the playbook without being controlled by the runtime manager. In the soft guardrail mode, the LLM can be prompted and tuned by the runtime manager when the playbook is initially provided, however the runtime manager will not control the manner in which particular sets of instructions are followed by the LLM. Tools, such as plug-ins can be used to define parameters and parameter constraints and these parameters can be returned to the LLM as free form text, which is itself parsed and incorporated into the execution of the playbook by the LLM.

The LLM can use the runtime manager to evaluate particular conditional expressions within the soft guardrail mode, but within a low level of control the playbook will not necessarily require the LLM to make specific requests to the runtime manager. For example, an instruction within a playbook may have a condition in which the LLM has to evaluate user information. The LLM may be able to determine the user-specific information that was previously identified within data that was previously identified by the LLM in connection with prior communications with the user. Accordingly, the LLM may automatically evaluate the user-specific information without seeking additional input or confirmation from the runtime manager. In addition, the LLM may automatically perform the playbook instructions that are conditional on the user-specific information without seeking approval or additional input from the runtime manager. Thus, in the soft guardrail mode, the LLM will be under a low level of control, and the runtime manager may not be aware of the LLM's current execution state within the playbook, and may not become aware of the LLM's execution state until much or all of the playbook has been executed. The execution state for the playbook can therefore be considered to be implicitly managed by the LLM during execution of a playbook under the soft guardrail mode.

A higher level of control could be provided to the runtime manager in connection with what may be referred to as a hard guardrail mode. In this mode, the runtime manager can be given access to the execution state of the LLM within the playbook more frequently, and can use the execution state to control the manner in which the LLM progresses through the sets of instructions within the playbook. For example, under the hard guardrail mode, the playbook may explicitly state that the LLM is to receive confirmation from the runtime manager regarding whether particular conditions have been satisfied, rather than the LLM making this determination on its own. In addition, in accordance with a playbook operating under a higher level of control, the runtime manager may be required to seek confirmation from the user prior to the LLM generating outputs for particular types of actions. For example, under a hard guardrail mode, the playbook may require user approval prior to the LLM generating an output that would result in a charge being made to the user's account.

For a still higher level of control, the runtime manager and LLM may act in what may be referred to as a strict mode. In this strict mode, the LLM will provide the runtime manager with its execution state within the playbook for each instruction that is performed, and it will be the responsibility of the runtime manager to determine each step that is taken in executing the playbook. Under the strict mode, LLM can be responsible for parsing a particular instruction, such as evaluating what parameters are identified in the instruction. In addition, the LLM can be responsible for generating a particular response, which has been specified within the instruction that is being executed.

A playbook may include an action execution loop that is a part of a guardrail mode. In this guardrail mode, the LLM may output one or more actions for the runtime manager to execute, and the LLM may wait to receive an observation from the runtime manager. The actions to be performed by the runtime manager may take different forms within the playbook. For example, if the action is of the form "RespondTemplate( . . . )," the runtime manager may produce the template response without having additional natural language generation performed by the LLM. If the action is of the form "EvaluateCondition(StepNumber)," the runtime manager may return the condition evaluation results as the observation for that action. If the action is of the form "Playbook( . . . )," the runtime manager may initiate an identified child playbook, including populating the child playbook with appropriate context information from the context of the parent playbook. The runtime manager can then wait for the executed child playbook to finish or fail in execution. In an action execution loop, the LLM may execute portions of the loop without outputting particular parameters to the runtime manager, unless the parameters are needed by the runtime manager as part of one of an action input, or unless the loop has ended. The loop ends when the associated actions of the loop are done or a failure of the actions is identified.

Figure 4:
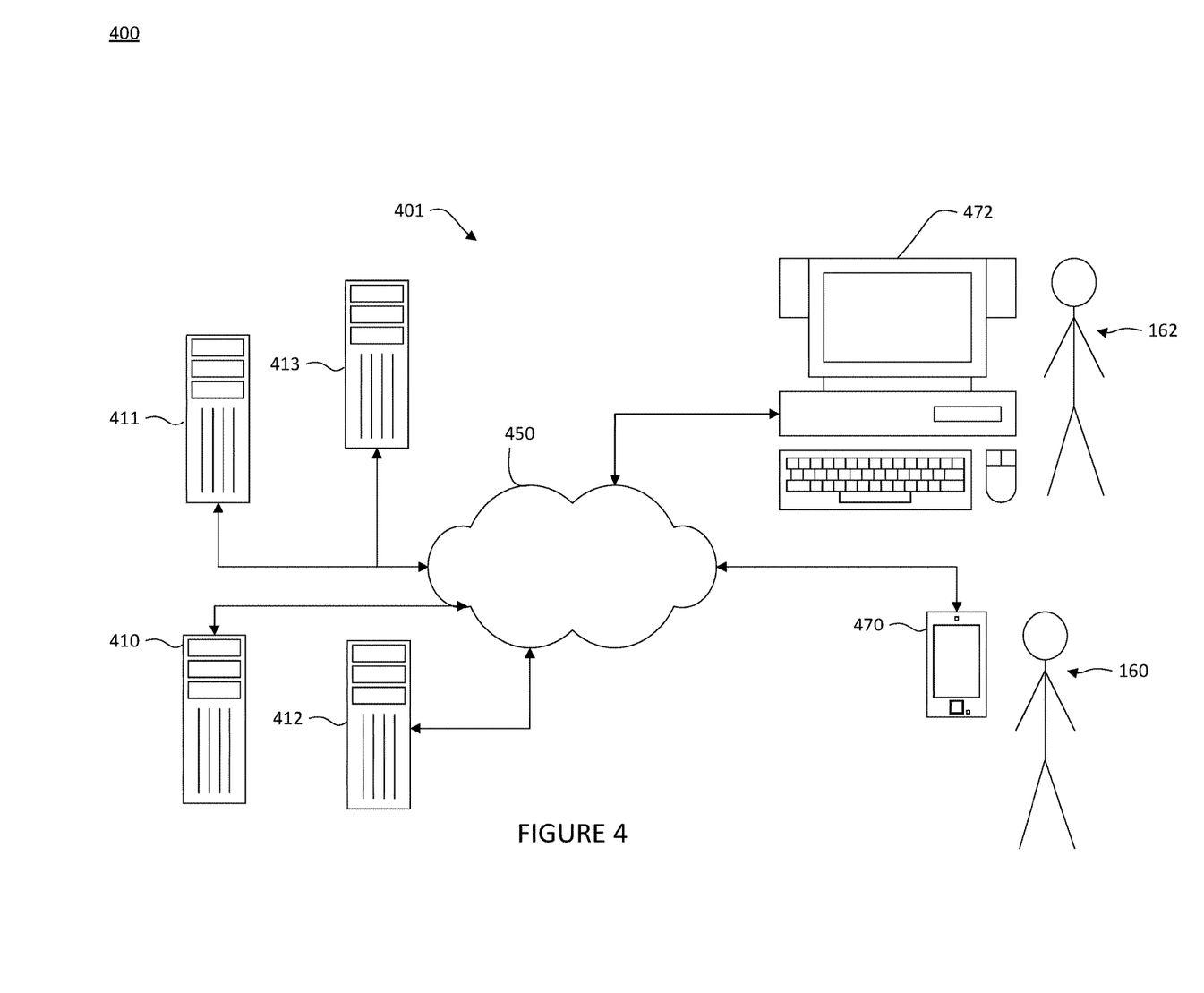
FIG. 4 is a block diagram of a system in accordance with aspects of the disclosure.

Returning to FIG. 1, the components of system 101 may be distributed over a plurality of devices. For example, runtime manager 102, LLMs 104, and memory 110 may each operate on separate computing devices, such as separate servers, which are connected via a network 450. FIG. 4 is a block diagram 400 of a system 401 in accordance with aspects of the disclosure. For example, server 410 may be configured to operate as one or more LLMs, while server 411 is configured to operate as a runtime manager, which can access databases that are stored on server 413. In addition, the LLM of server 410 and runtime manager of server 411 may make call to remote tools, such as one or more plug-ins that run on server 412. In addition, users 160 and 162 may operate mobile device 470 and computer 472, respectfully. Mobile device 470 and computer 472 may each communicate with one or more of the servers 411-413. For example, users 160 and 162 may provide input via mobile device 470 and computer 472 in connection with one or more applications running on their respective devices. This user input may be transmitted to server 411, in which it is received by a runtime manager, which in turn identifies a playbook stored on server 413 that is responsive to the user input. The LLM of server 410 may then implement the playbook under the control of the runtime manager. The user input from mobile device 470 and computer 472 may include one or more inputs that identify a level of control that the runtime manager is to exert over the LLM as the playbook is being executed.

Figure 5:
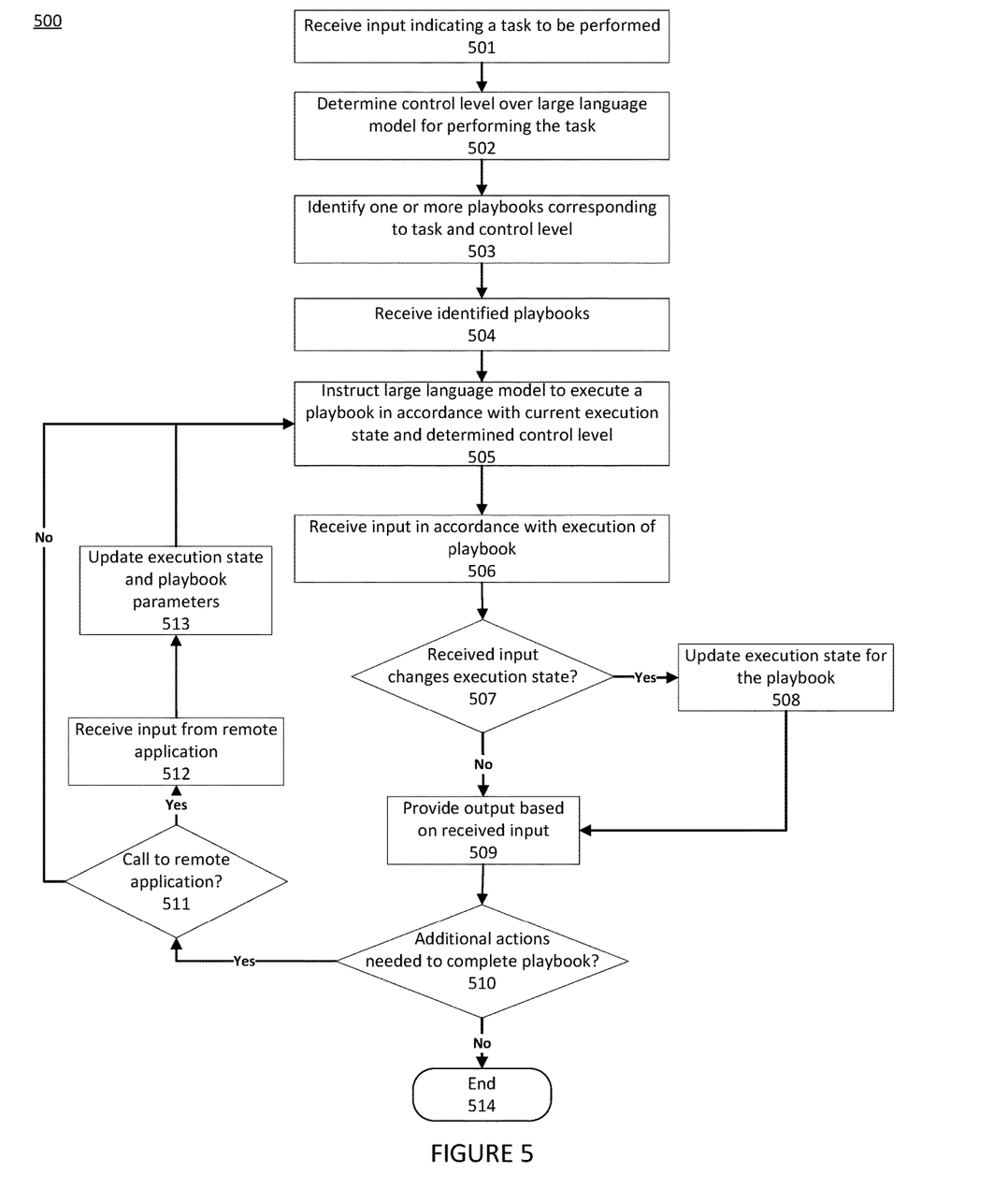
FIG. 5 is flow diagram in accordance with aspects of the disclosure.

FIG. 5 is a flow diagram 500 of operations that may be performed in accordance with aspects of the disclosure. One or more of the operations identified in flow diagram 500 may be performed simultaneously to one another, or may be performed in an altered sequence without going beyond the scope of the current disclosure. Additional operations may also be performed, and some operations not performed, while still remaining within the scope of the disclosure. The operations of flow diagram may be performed by one or more components of systems 101 and 401 described above.

For example, the runtime manager 102 of FIG. 1 may be configured to perform or control various operations set forth in flow diagram 500.

In accordance with block 501, a runtime manager may receive an input in connection with a task to be performed. This task may be based on a user input that has been communicated from a remote device. In addition, the user input may include an identification of a control level that is to be exerted over an LLM in connection with performing the task. In accordance with block 501, the runtime manager may determine the control level that is to be maintained over the large language model in performing the task in accordance with a playbook. The runtime manager may also identify one or more playbooks that correspond to the identified task and to the determined control level (block 503). This identification may include requesting one or more particular playbooks from a database of playbooks, wherein the one or more particular playbooks have been designated as corresponding to the identified task and for which the playbook has been configured to correspond to the determined control level. The runtime manager may receive the identified playbooks from the database of playbooks (block 504).

The runtime manager may instruct a large language model to execute one of the received playbooks in accordance with the determined control level (block 505). As discussed above, the runtime manager may provide the LLM with playbook prompts that identify the goal to be achieved by executing the playbook, as well as identifying the available parameters and tools that can be used in performing various actions in connection with the playbook. In connection with executing the instructions of the playbook, the runtime manager can receive an input from the LLM (block 506). This input may include identification of the instructions that have been performed within the playbook, but may also include a request for a particular action to be taken by the runtime manager, such as a request to evaluate a particular parameter. The received input may also take the form of a request for confirmation to be received from a user, a call to a remote application, or a request for implementation of another playbook.

In accordance with block 507, the runtime manager may determine if the received input alters the execution state with respect to the playbook. For example, the runtime manager may receive an input from the LLM indicating that particular instructions have been performed and/or particular parameters have been assigned particular values. This information may be provided by the LLM in accordance with the control level that has been designated for executing the playbook. If the input received by the runtime manager alters the execution state of the playbook, the runtime manager may update the playbook's execution state in accordance with the received input (block 508). For example, runtime manager may maintain in memory the current execution state for one or more playbooks that are currently in the process of being executed by the LLM.

If the received input does not alter the execution state of the playbook, the runtime manager may identify the appropriate output that is to be provided based on the received input (block 509). For example, if the received input requests a call to a remote plug-in or requests confirmation from a user, the runtime manager can make the call to the plug-in or make the necessary request to a user. If the received input requests confirmation of a particular condition or value of a particular parameter, the runtime manager may confirm whether the condition is satisfied or provide the LLM with the parameter value. In accordance with block 510, a determination can be made, based on the execution state of the playbook, whether additional actions are needed in order to complete the playbook. If not, the playbook execution can end (block 514). However, if the execution state indicates that the playbook execution is not complete, the runtime manager may proceed to execute the playbook.

In accordance with block 511, it is determined whether a call has been made to a remote application. This may include a call to a plug-in or a communication to an application running on a user device. If such a call has been made, the runtime manager may receive an input from the remote application in accordance with block 512. The runtime manager may then update the execution state and/or the playbook parameters based on the received input from the remote application (block 513). If no remote application call was made, or if the playbook has been updated based on the received input from the remote application, the runtime manager can instruct the large language model to continue executing the playbook in accordance with the current execution state of the playbook (block 505). The operations of blocks 505-513 can then be repeated as necessary, until it has been determined that each of the one or more identified playbooks have been completed.

As discussed above, the control level will determine the extent to which the runtime manager will receive inputs from the LLM that indicate a change in execution state. Under a low level of control, the LLM may perform a plurality of instructions without providing the runtime manager with input that indicates what instructions have been executed. Thus, the extent to which the runtime manager updates the execution state in accordance with block 508 will be determined, at least in part, by the level of control that has been given to the runtime manager of the LLM's execution of the playbook.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling conversational artificial intelligence comprising:
    receiving, by one or more computing devices, a playbook, wherein the playbook contains a plurality of instructions to be performed in connection with performing a task, and wherein at least a subset of the instructions are in a natural language format;
    identifying, by the one or more computing devices, a control level that defines an extent to which the one or more computing devices are to identify particular execution states in connection with execution of the playbook by a large language model;
    instructing, by the one or more computing devices, the large language model to execute the playbook;
    identifying, by the one or more computing devices and in accordance with the control level that has been identified, an execution state in connection with the large language model executing one or more instructions within the playbook; and
    providing, by the one or more computing devices, an output based on the identified execution state.

2. The method of claim 1, further comprising selecting between at least a first level of higher control and a second level of lower control, and wherein the one or more computing devices identify more execution states under the first level of higher control than under the second level of lower control.

3. The method of claim 1, wherein under a low level of control, the large language model executes the playbook by performing a group of multiple instructions from the plurality of instructions without providing the one or more computing devices with an execution state in connection with the group of multiple instructions.

4. The method of claim 1, further comprising receiving a user input that identifies the control level from a plurality of potential control levels, and wherein the playbook is configured in accordance with the control level.

5. The method of claim 1, wherein the playbook is a first playbook from a plurality of playbooks, and wherein the method further comprises selecting the first playbook from the plurality of playbooks based on the control level that has been identified.

6. The method of claim 1, wherein the playbook is a first playbook from a plurality of playbooks, and wherein the plurality of instructions of the first playbook comprises an instruction to execute a second playbook.

7. The method of claim 1, wherein instructing the large language model to execute the playbook further comprises creating, by the one or more computing devices, a dynamically composed prompt based on a user context.

8. The method of claim 1, wherein executing the playbook includes executing a stack of calls to task operators, and further comprising identifying, by the one or more computing devices, a current position within the stack.

9. The method of claim 1, wherein executing the playbook includes calling a remote application that provides one or more returned values, and wherein the one or more returned values are provided to the large language model by dynamically updating the playbook during execution of the playbook by the large language model.

10. A system for controlling conversational artificial intelligence comprising one or more computing devices configured to:
    receive a playbook, wherein the playbook contains a plurality steps in connection with performing a task, and wherein at least a subset of the steps are in a natural language format;
    identify a control level for execution of the playbook, wherein the control level defines an extent to which the one or more computing devices are to identify particular execution states in connection with execution of the playbook by a large language model;
    communicate with the large language model so as to execute the playbook in accordance with communications from the one or more computing devices;
    identify, and in accordance with the control level that has been identified, an execution state in connection with the large language model executing one or more instructions within the playbook; and
    provide an output based on the identified execution state.

11. The system of claim 10, wherein the one or more computing devices are further configured to select between a first level of higher control and a second level of lower control, wherein the runtime manager identifies more execution states under the first level of higher control than under the second level of lower control.

12. The system of claim 10, wherein under a low level of control, the large language model is configured to execute the playbook by performing a group of multiple instructions from the plurality of instructions without providing the one or more computing devices with an execution state in connection with the group of multiple instructions.

13. The system of claim 10, wherein the one or more computing devices are further configured to receive a user input selecting the control level from a plurality of control levels, and wherein the playbook is configured in accordance with the control level.

14. The system of claim 10, wherein the playbook is a first playbook from a plurality of playbooks, and wherein identifying the control level further comprises selecting the first playbook from the plurality of playbooks based on the control level that has been identified.

15. The system of claim 10, wherein the playbook is a first playbook from a plurality of playbooks, and wherein the plurality of instructions of the first playbook comprises an instruction to execute a second playbook.

16. The system of claim 10, wherein the one or more computing devices are further configured to instruct the large language model to execute the playbook by providing a dynamically composed prompt based on a user context.

17. The system of claim 10, wherein the one or more computing devices are further configured to manage execution states for a stack of playbooks.

18. The system of claim 10, further comprising a remote application, and wherein executing the playbook includes calling the remote application, and wherein one or more returned values from the remote application are provided to the large language model in the context of dynamically updating the playbook during execution of the playbook by the large language model.

* * * * *